March 9, 1965 W. T. FULLERTON 3,173,065

TONE DETECTOR

Filed Aug. 6, 1962

INVENTOR.
William T. Fullerton
BY
C. A. Gulbrandsen
Atty.

United States Patent Office 3,173,065

Patented Mar. 9, 1965

3,173,065
TONE DETECTOR

William T. Fullerton, Park Ridge, Ill., assignor to Automatic Electric Laboratories, Inc., Northlake, Ill., a corporation of Delaware Filed Aug. 6, 1962, Ser. No. 215,143
8 Claims. (Cl. 317—147)

This invention relates to a tone detection device and more particularly to a tone detector that is discriminatory of both the frequency and the amplitude of a single tone.

In voice and data communications it frequently becomes necessary to detect a tone signal or discriminate between several tones. Most tone detectors sample the line or other signal source and by inclusion of a frequency selective filter circuit in the sampling path operate a relay or similar device in response to tone signals of that frequency passed by the filter circuits.

"Band Pass" filters, the type usually employed in tone detectors have both an upper and lower cut off point which permits transmission of only those frequencies lying between the two cut off frequencies. Ideally speaking such a filter would transmit only frequencies within the pass band, rejecting all others. In practice this idea cannot be fully met. To increase the selectivity, filters of extremely sophisticated design are used; many comprising several stages to achieve the degree of attenuation desired of unwanted frequencies.

Tone detectors of the type described are frequently subject to false operation caused by spurious signals on the line that include frequency components that are able to pass through the filter stages. Usually a tone signal when actually transmitted for control or signalling purposes is also of a certain minimum amplitude. Random noise signals rarely are of the same amplitude as a true tone signal.

Accordingly it is the object of the instant invention to provide a tone detector that has a high degree of selectivity for a desired frequency tone of a certain minimum amplitude.

One feature of the present invention is circuitry that utilizes an incoming tone signal as a power source.

Another feature is the inclusion of frequency selective components in the power supply portion of the instant invention.

Yet another feature shall be the inclusion of means for adjusting the sensitivity of the instant tone detector for incoming signals of specific amplitude.

The above-mentioned and other objects and features of this invention will become more apparent by reference to the following description taken in connection with the accompanying drawings in which.

Figure 1:
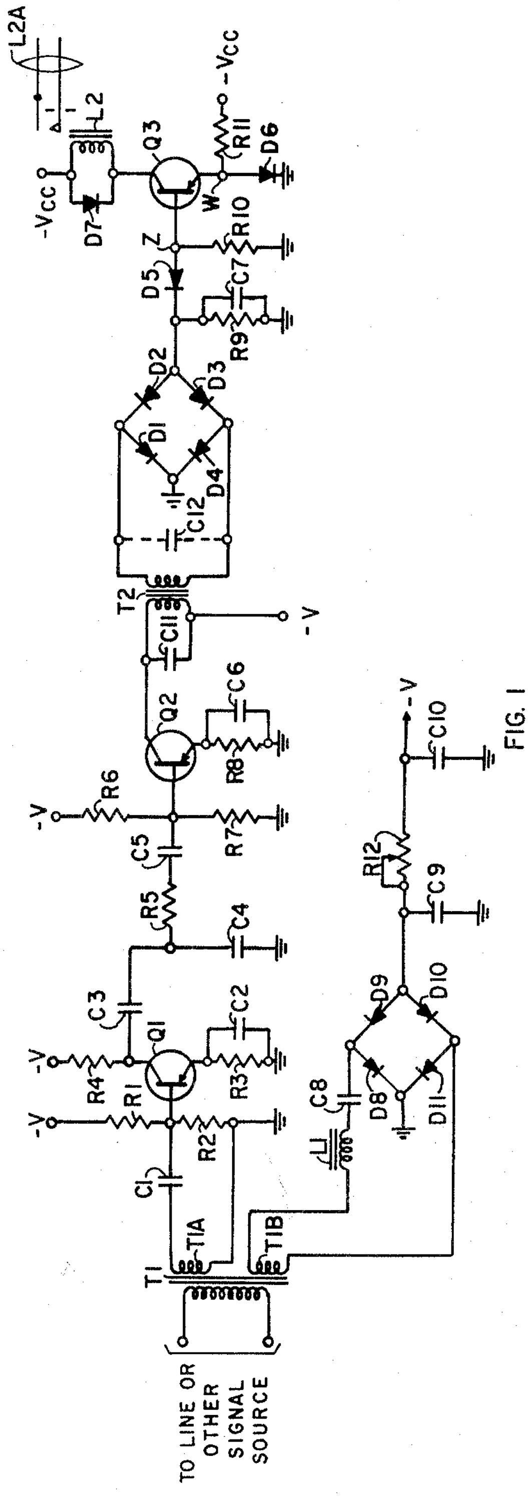
FIG. 1 is a schematic diagram of a tone detector embodying the principles of this invention.

Referring now to FIG. 1, the tone detector is coupled to a telephone or telegraph line or a similar source over which the tone signals to be detected are transmitted. Coupling is by means of transformer T1, the primary of which is coupled to the line or other signal source. Transformer T1 has two secondary windings, secondary winding T1A coupled to the high pass portion of the band pass filter, and secondary winding T1B connected to the power supply portion of the tone detector.

Incoming signals are coupled to the power supply portion by the secondary winding T1B through a series resonant circuit consisting of inductances L1 and capacitance C8 to the rectifier bridge consisting of diodes D8, D9, D10 and D11. The values of L1 and C8 are selected to be resonant or "peak" at the same frequency as the band pass filter. Therefore the output voltage from the power supply is proportional to the deviation of the input frequency, further the power supply voltage is also proportional to the amplitude of the incoming signal. This incoming A.C. signal is of maximum amplitude at at the desired frequency and is rectified at the diode bridge consisting of diodes D8, D9, D10 and D11. The rectified signal is filtered by an RC filter consisting of capacitances C9 and C10 and resistance R12. Resistance R12 is also adjustable so that the output D.C. potential available from the power supply can be adjusted for the degree of sensitivity required for a specific application. The D.C. potential indicated as —V is taken from the power supply and applied to the appropriate points in the band pass filter portion designated similarly.

The detector portion in general is a cascaded RC band pass filter. The high pass filter section consists of capacitance C1 and resistances R1 and R2. Thus incoming signals received at transformer T1 are coupled via secondary T1A to this filter allowing incoming signals above the lower limit of pass band to be applied to the base of amplifying transistor Q1. The amplified signal containing frequencies above the lower limit of the pass band are applied to the low pass filter section consisting of capacitance C4 and resistance R5. The resultant tone signals within the band pass limits of the tone detector are coupled through capacitance C5 to the base of amplifying transistor Q2. The output of amplifying transistor Q2 is transformer coupled to the output stage by means of transformer T2. Additional increase in the "Q" of the tone detector circuit is achieved by tuning the primary of the transformer T2 with capacitance C11 and the secondary of transformer T2 with capacitance C12. The resultant output signal falling within the pass band design of the tone detector is rectified by a diode bridge consisting of diodes D1, D2, D3 and D4.

The rectified output of the diode bridge is applied through diode D5 to the base of transistor Q3 which functions as a transistor switch. After diode D5 starts to conduct in the forward direction, point "Z" becomes sufficiently more negative than point "W" and transistor Q3 starts to conduct, at which time the relay L2 will operate. The diodes D6 and D7 provide a pedestal voltage point which must be overcome to operate the relay thus decreasing the circuit sensitivity to noise. Operation of relay L2 will close contacts L2A representative of any contact combination that might be utilized in a tone detector device of this sort.

Figure 2:
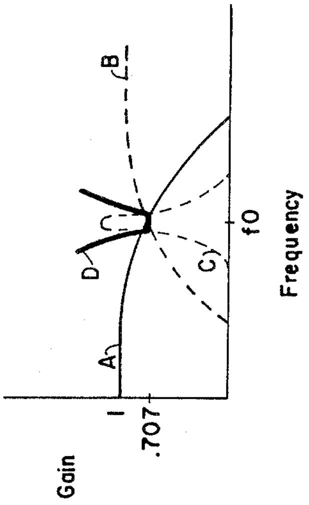
FIG. 2 illustrates a set of curves useful in understanding the operation of the circuit of FIG. 1.

Reference to FIG. 2 gives some idea of the effectiveness of the instant tone detector. The curve A represents the low frequency response of the low pass filter stage consisting of capacitance C4 and resistance R5. Curve B shows the high frequency response created by high pass filter stage consisting of capacitance C1 and resistances R1 and R2. Curve C shows the resonant peak portion of the signal which is rectified for use in the power supply stage of the tone detector. It is obvious then that the effective pass band of the tone detector of the instant invention is based on the combining of the limits of curves A and B with the peak of curve C to achieve the pass band of curve D. This effective pass band is far greater than that usually obtainable with conventional band pass filter type of tone detector as well as having the additional advantage of being unaffected by spurious signals that might be of the proper frequency but are not of the proper amplitude desired for an incoming tone signal. Having thus described my invention what is claimed is:

1. A tone detector for detecting the presence of tone signals of a selected frequency, received from a tone source, comprising: an input circuit connected to said tone source; an output circuit operated in response to amplified tone signals of said selected frequency to indicate the presence of said signals; frequency selective amplification means connected between said input means and said output means operable in response to operating potential to extend and amplify tone signals of said selected frequency from said input circuit, to said output circuit; frequency selective power supply means connected between said input means and said amplification means operated in response to tone signals of said selected frequency received from said tone source to convert said tone signals to operating potential, and extend said potential to said amplification means, rendering said amplification means operated.

2. A tone detector as claimed in claim 1 wherein said input circuit comprises a transformer including a primary winding connected to said tone source; a first secondary winding connected to said amplification means and a second secondary winding connected to said power supply means.

3. A tone detector as claimed in claim 1 wherein said output circuit comprises: rectification means connected to said amplification means operated in response to amplified tone signals of said selected frequency to convert said signals to direct current potential; a transistor switch; a relay including an operating path through said transistor switch; and coupling means connected between said rectifier means and said transistor switch operated in response to direct current potential from said rectifier means to extend said direct current potential to said transistor switch to operate said switch to complete the operating path for said relay to operate said relay.

4. A tone detector as claimed in claim 1 wherein said frequency selective amplification means comprise: a first amplifier; a high pass filter connected between said input circuit and said first amplifier operated in response to tone signals having as a lower frequency limit said selected frequency to extend said signals to said amplifier; said first amplifier operated in response to said selected tone signals and the connection of operating potential to said first amplifier means; second amplifier means; low pass filter means connected between said first amplifier means and said second amplifier means operated in response to receipt of amplified tone signals from said first amplifier to extend tone signals having as an upper limit said selected frequency to said second amplifier; said second amplifier operated in response to said selected frequency tone signals and connection to said operating potential.

5. A tone detector as claimed in claim 1 wherein said frequency selected power supply means comprise: a rectifier circuit; a circuit resonant at said selected frequency connected between said input circuit and said rectifier means operated in response to tone signals received from said input means to extend tone signals of said selected frequency to said rectifier means; said rectifier means operated in response to tone signals of said selected frequency to rectify said signals to operating potential and extend said operating potential to said amplifier means.

6. A tone detector as claimed in claim 5 wherein said power supply means further includes: adjusting means connected between said rectifier and said amplification means whereby the operating potential from said rectifier means conducted to said amplifier means may be adjusted to control the amount of amplification provided by said amplification means.

7. A tone detector for detecting the presence of tone signals of a selected frequency, received from a tone source, comprising: an input circuit connected to said source of tone signals; an output circuit operated in response to amplified tone signals of a selected frequency to indicate the presence of said tone signals; an amplifier circuit; a first frequency selective circuit connected between said input circuit and said amplifier operated to extend only tone signals of said selected frequency to said amplifier; a power supply circuit including circuit connections to said amplifier circuit; a second frequency selective circuit connected between said input circuit and said power supply circuit operated to extend only tone signals of said selected frequency to said power supply; said power supply operated in response to tone signals of said selected frequency to convert said signals to operating potential and extend said potential to said amplifier; said amplifier circuit operated in response to said tone signals of said selected frequency and said operating potential to extend amplified tone signals of said selected frequency to said output circuit.

8. A tone detector for detecting the presence of tone signals of a selected frequency received from a tone source, comprising: a transformer having a primary winding connected to said signal source and first and second secondary windings; a first amplifier operable in response to the presence of operating potential; a high pass filter connected between said first secondary winding and said first amplifier operated in response to application of tone signals at the primary winding of said transformer to couple tone signals to said first amplifier having as a lower frequency limit said selected frequency; a second amplifier operable in response to operating potential; a low pass filter connected between said first amplifier and said second amplifier operated in response to amplified tone signals received from said first amplifier to couple tone signals to said second amplifier having as an upper frequency limit said selected frequency; said tone signals applied to said second amplifier limited to said selected frequency; a first rectifier coupled to said second amplifier operated in response to amplified tone signals at said selected frequency received from said second amplifier to convert said signals to an output potential; means connected to said first rectifier operated in response to said operating potential to indicate the presence of tone signals of said selected frequency; a second rectifier circuit; a circuit resonant at said selected frequency connected between said second secondary winding and said second rectifier, operated in response to application of tone signals at the primary winding of said transformer to couple signals only of said selected frequency to said second rectifier, said second rectifier operated in response to the receipt of said selected signals to convert said selected signals to operating potential and extend said operating potential to said first and second amplifier; said first and second amplifiers operated in response to said operating potential.

References Cited by the Examiner

UNITED STATES PATENTS

| | | | |
|---|---|---|---|
| 2,685,665 | 8/54 | Price | 317—149 |
| 2,747,146 | 5/56 | McDonald | 317—149 X |
| 2,960,637 | 11/60 | Lüscher | 317—148.5 X |
| 3,119,047 | 1/64 | Michalski | 317—147 X |

SAMUEL BERNSTEIN, *Primary Examiner.*